United States Patent
Jones

(10) Patent No.: US 10,046,738 B2
(45) Date of Patent: *Aug. 14, 2018

(54) HEATED WIPER BLADE FOR MOTOR VEHICLES AND THE LIKE

(71) Applicant: HWB, LLC, Rockford, MI (US)

(72) Inventor: Johnnie L. Jones, Pierson, MI (US)

(73) Assignee: HWB, LLC, Rockford, MI (US)

(*) Notice: Subject to any disclaimer, the term of this patent is extended or adjusted under 35 U.S.C. 154(b) by 619 days.

This patent is subject to a terminal disclaimer.

(21) Appl. No.: 14/643,673

(22) Filed: Mar. 10, 2015

(65) Prior Publication Data

US 2015/0183402 A1    Jul. 2, 2015

Related U.S. Application Data

(63) Continuation of application No. 13/177,382, filed on Jul. 6, 2011, now Pat. No. 9,003,595.

(60) Provisional application No. 61/361,628, filed on Jul. 6, 2010.

(51) Int. Cl.
  *B60S 1/38*    (2006.01)
  *B60S 1/40*    (2006.01)

(52) U.S. Cl.
  CPC ............ *B60S 1/3805* (2013.01); *B60S 1/381* (2013.01); *B60S 1/3848* (2013.01); *B60S 1/3882* (2013.01); *B60S 1/4006* (2013.01); *B60S 1/3875* (2013.01); *B60S 1/3881* (2013.01)

(58) Field of Classification Search
  CPC ...... B60S 1/381; B60S 1/3805; B60S 1/3848; B60S 1/3874; B60S 1/3875

USPC .......... 15/250.06–250.09, 250.201; 219/202, 219/203
See application file for complete search history.

(56) References Cited

U.S. PATENT DOCUMENTS

| | | |
|---|---|---|
| 2,627,011 A | 1/1953 | Eaves |
| 3,489,884 A | 1/1970 | Waseleski |
| 4,138,759 A | 2/1979 | Voorhees |
| 4,152,808 A | 5/1979 | Andregg |
| 4,194,261 A | 3/1980 | Parkinson |
| 4,325,160 A | 4/1982 | Burgess |
| 4,360,941 A | 11/1982 | Mabie |
| 4,387,290 A | 6/1983 | Yasuda |

(Continued)

FOREIGN PATENT DOCUMENTS

| | | |
|---|---|---|
| DE | 10234267 | 2/2004 |
| DE | 102005032698 | 1/2007 |

(Continued)

OTHER PUBLICATIONS

PCT International Preliminary Search Report: Int'l Appln. No. PCT/US2008/079684; Applicant Malone, Randolph W. (dated Apr. 19, 2011).

(Continued)

*Primary Examiner* — Gary Graham
(74) *Attorney, Agent, or Firm* — Price Heneveld LLP

(57) ABSTRACT

A heated wiper blade for motor vehicles includes an elongated flexible beam and a heating element extending along the beam. The heating element may be configured to provide increased heat at the central portion of the blade and at the opposite ends of the blade. The flexible beam may include curved end portions and a flat or reduced curvature central portion. The heating element is preferably covered and sealed off to prevent loss of heat energy.

18 Claims, 17 Drawing Sheets

(56) References Cited

U.S. PATENT DOCUMENTS

| | | |
|---|---|---|
| 4,497,083 A | 2/1985 | Nielsen, Jr. et al. |
| 4,928,344 A | 5/1990 | Bliss |
| 4,928,345 A | 5/1990 | Meltzer et al. |
| 4,967,437 A | 11/1990 | Morse |
| 5,157,314 A | 10/1992 | Kuhbauch |
| 5,325,561 A | 7/1994 | Kotlar |
| 5,412,177 A | 5/1995 | Clark |
| 5,488,752 A | 2/1996 | Randolph |
| 5,504,965 A | 4/1996 | Guell |
| 5,558,792 A | 9/1996 | Gauharon |
| 5,603,856 A | 2/1997 | Bischoff |
| 5,632,058 A | 5/1997 | Stanak |
| 5,791,010 A | 8/1998 | Brady et al. |
| 5,826,293 A | 10/1998 | Holland |
| 5,831,242 A | 11/1998 | Gallagher |
| 5,881,428 A | 3/1999 | Simmons |
| 6,236,019 B1 | 5/2001 | Piccione et al. |
| 6,507,973 B1 | 1/2003 | Friesen |
| 6,591,443 B1 | 7/2003 | Gilpin |
| 6,678,915 B1 | 1/2004 | Ravenell |
| 6,754,933 B1 | 6/2004 | Petterson |
| 6,779,222 B2 | 8/2004 | Tobias |
| 6,874,195 B2 | 4/2005 | Kotlarski et al. |
| 7,721,382 B2 | 5/2010 | Malone |
| 8,327,496 B2 | 12/2012 | Kim |
| 2004/0010880 A1 | 1/2004 | Tobias |
| 2004/0025280 A1 | 2/2004 | Krickau et al. |
| 2005/0011033 A1* | 1/2005 | Thomar .......... B60S 1/381 15/250.201 |
| 2006/0026786 A1 | 2/2006 | Ku |
| 2006/0156529 A1 | 7/2006 | Thomar |
| 2007/0089258 A1 | 4/2007 | Wick |
| 2007/0094832 A1 | 5/2007 | Franco |
| 2008/0256738 A1 | 10/2008 | Malone |
| 2009/0100626 A1 | 4/2009 | Kim |

FOREIGN PATENT DOCUMENTS

| | | |
|---|---|---|
| GB | 1520975 | 8/1978 |
| JP | 2008254585 | 10/2008 |
| JP | 2009096449 | 5/2009 |
| KR | 20000012808 | 3/2000 |
| SU | 934902 | 6/1982 |
| UA | 49624 | 10/2002 |
| WO | 2009118286 | 10/2009 |

OTHER PUBLICATIONS

Canadian Intellectual Property Office notice, Appln. No. 2,740,384; Owner: HWB, LLC; Title Frameless, Heated Wiper Assembly and System Utilizing Same (dated Feb. 15, 2012).

Patent Cooperation Treaty, International Search Report and Written Opinion in the matter of PCT/US2011/043090 (dated Feb. 23, 2012).

CCPIT Patent and Trademark Law Office, Notification of First Office Action, Appln. Serial No. 200880132021.1 for Frameless, Heated Wiper Assembly and System Utilizing Same (dated Jan. 14, 2013) (original and translation).

Russian Federation, Decision on Grant, Appln. Serial No. 2011119017(028132), dated Jul. 4, 2012, for Frameless Heated Wiper Assembly and System Utilizing Same (original and translation).

European Search Report, Appln. No. 08 825 262.2, PCT/US2008079684, Applicant HWB, LLC (dated Nov. 26, 2013).

Korean Patent Office, Preliminary Rejection, Appln. Serial No. 10-2011-7010786, for Frameless Heated Wiper Assembly and System Utilizing Same (original and translation).

* cited by examiner

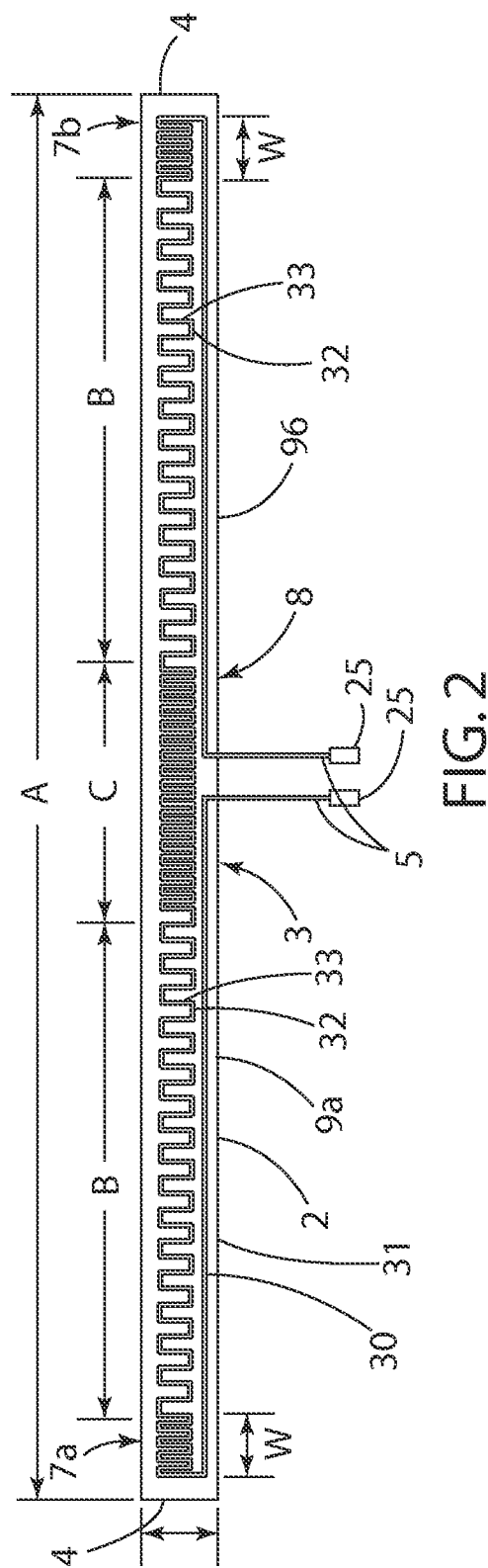

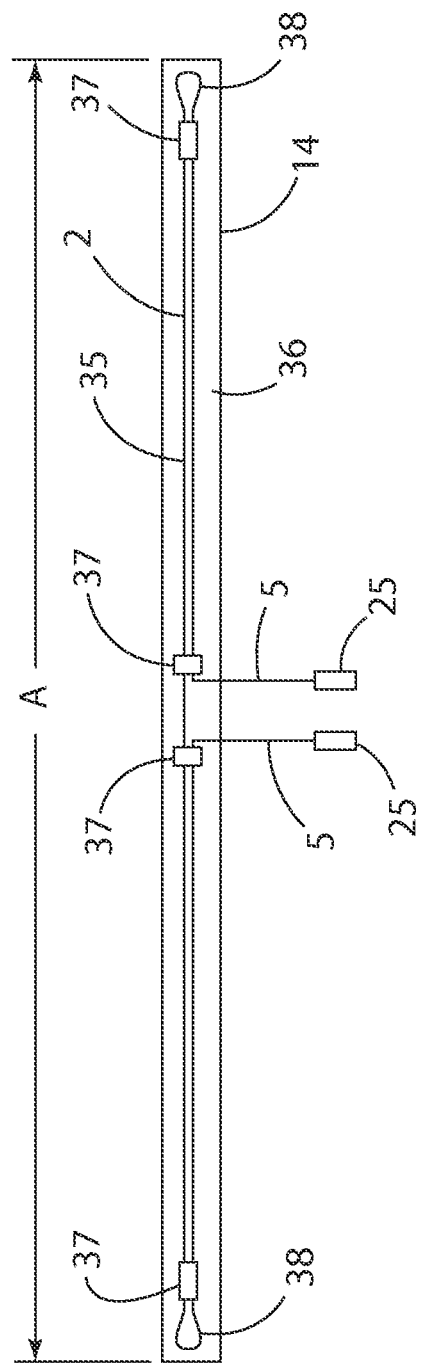

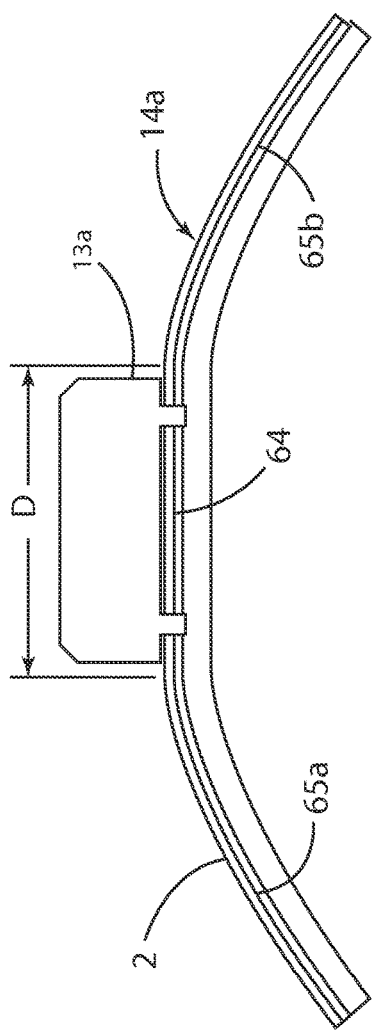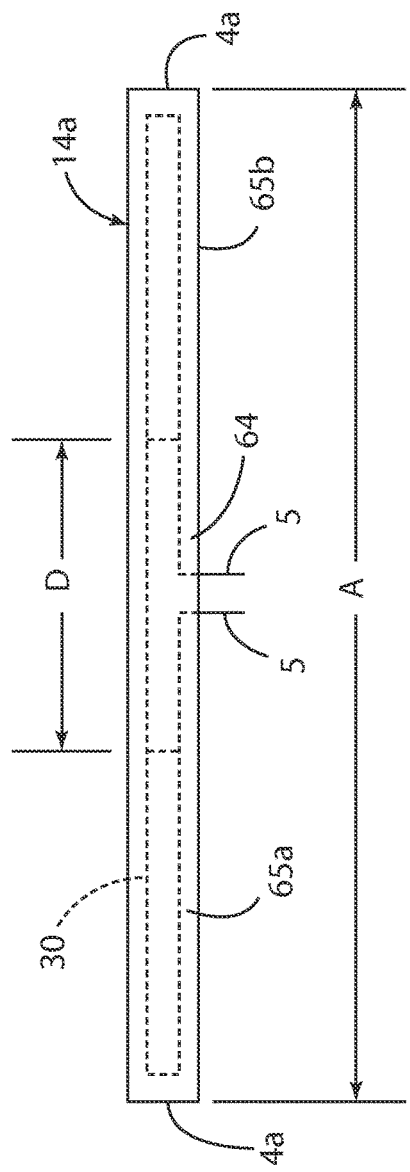

HEATED WIPER BLADE FOR MOTOR VEHICLES AND THE LIKE

CROSS REFERENCE TO RELATED APPLICATION AND CLAIM TO PRIORITY

The present application is a continuation application of commonly assigned U.S. application Ser. No. 13/177,382, filed Jul. 6, 2011, now U.S. Pat. No. 9,003,595, issued Apr. 14, 2015, entitled HEATED WIPER BLADE FOR MOTOR VEHICLES AND THE LIKE, which is related to U.S. Provisional Patent Application No. 61/361,628, filed Jul. 6, 2010, entitled IMPROVED HEATED WIPER BLADE FOR MOTOR VEHICLES AND THE LIKE, both of which are incorporated herein by reference, and claims priority thereto under 35 U.S.C. § 119.

BACKGROUND OF THE INVENTION

The present invention relates to windshield wiper blades for motor vehicles and the like, and in particular to an improved heated wiper blade and associated method.

Heated windshield wipers are generally known in the art, and include many different forms and designs. Some such heated wiper blades heat the wiper frame, arm and blade, or a combination of these members, using a heating element or some other type of added assembly. While such wiper blades are somewhat effective, they are inconvenient to both the manufacturer and the end user. For example, they are either very costly to manufacture, thereby resulting in a high cost product that is passed through to the consumer, or they are very complex to install, thereby eliminating many of the do-it-yourself consumers. Also, such prior designs fail to consider that the wiper should work effectively with the windshield defrosting system of the motor vehicle as a fully integrated functional unit. Without the windshield defroster system, the windshield will freeze up with the accumulated snow and ice, creating a hazardous situation.

A unique frameless heated wiper assembly is disclosed in U.S. Pat. No. 7,721,382, the entire contents of which are incorporated by reference. While such wiper assemblies are generally effective, certain improvements to the same would be advantageous.

SUMMARY OF THE INVENTION

One aspect of the present invention is a heated wiper blade for motor vehicles and the like having certain improvements to the invention disclosed in U.S. Pat. No. 7,721,382, as disclosed in greater detail hereinafter.

Yet another aspect of the present invention is to provide an improved heated wiper blade and associated method that is economical to manufacture, efficient in use, and particularly well adapted for the proposed use.

These and other advantageous of the invention will be further understood and appreciated by those skilled in the art by reference to the following written specification, claims and appended drawings.

BRIEF DESCRIPTION OF THE DRAWINGS

FIG. 2 is a schematic view of a heated wiper blade made of conducting material;

FIG. 2A is a partially schematic view of a beam and heating element according to another aspect of the present invention;

FIG. 5;

FIG. 11 is a side elevational view of a beam for heated wiper assemblies, wherein the beam has a flat center portion;

FIG. 12 is a plan view of the beam of FIG. 11;

DETAILED DESCRIPTION OF THE PREFERRED EMBODIMENTS

Figure 1:
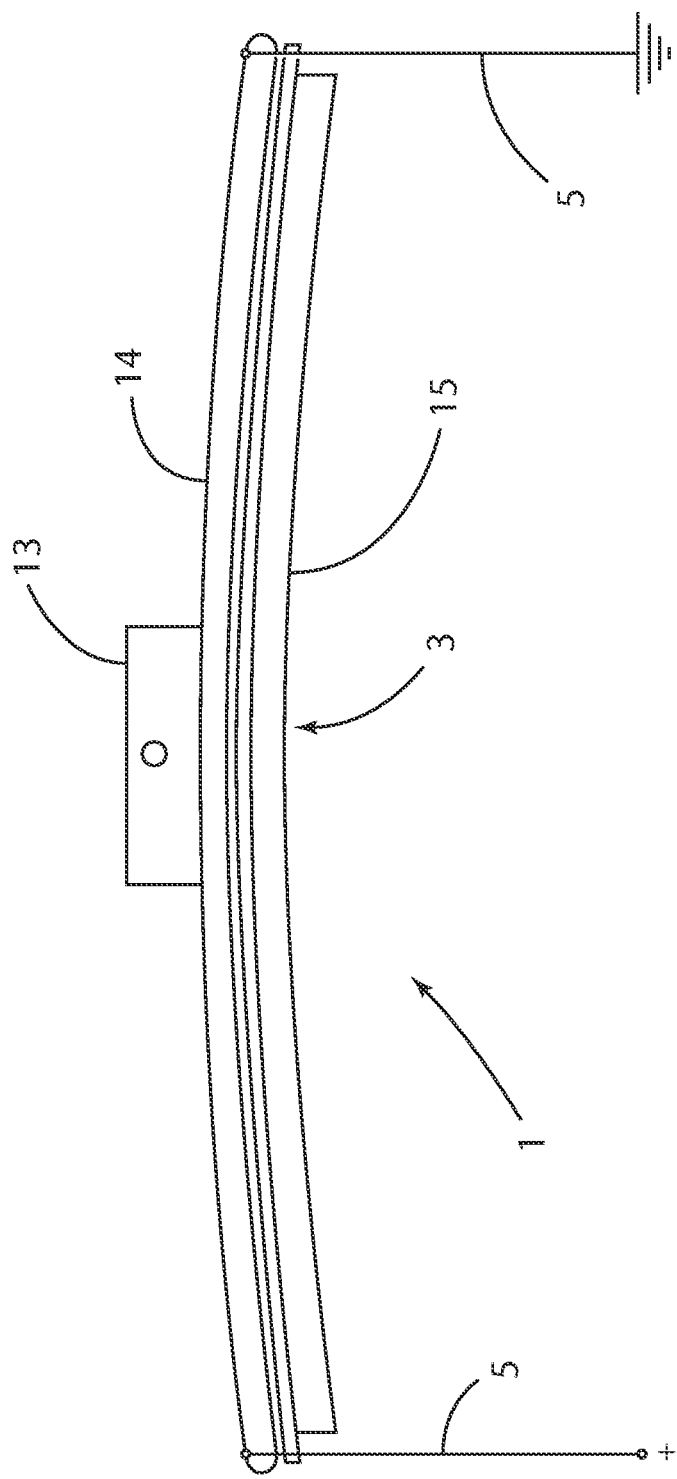
FIG. 1 is a schematic view of a heating element of a heated wiper blade according to one aspect of the present invention.

For purposes of description herein, the terms "upper," "lower," "right," "left," "rear," "front," "vertical," "horizontal" and derivatives thereof shall relate to the invention as oriented in the attached drawing. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 generally designates a heated wiper blade embodying the present invention, which is schematically illustrated in FIG. 2. A heating element 2 is embedded in wiper blade 1 using a unique pattern to achieve an improved distribution of heat and wiping performance. More specifically, increased heat is provided in the center 3 of the wiper blade 1 to compensate for wind. Also, increased heat is provided at a section "W" (FIG. 2). Inner boundary 6 of W may be about 0.5 inches from each end 4 of the blade 1 to compensate for the metal portion of the blade 1 not being in contact with the heating element 2, and because the heating element cannot be positioned all the way to the ends of the beam. The illustrated heating element 2 has leads 5 disposed adjacent the center 3 of blade 1, which are connected with the electrical power system of the associated motor vehicle.

Heater element 2 may comprise a Kapton or silicone etched foil adhesive backed strip. Thermistor or PTC material on the foil strip facilitates regulation of the temperature of the blade 1. Preferably, wiper blade 1 is grounded, so that only the positive lead needs to be run under the hood of the vehicle. Electrical power to the wiper blade 1 is preferably provided only after the ignition switch of the vehicle has been turned on. Airflow is sealed off on each side of the center 3 of the wiper blades 1 utilizing a sealant or other suitable material to prevent cooling of the heating element 2. A temperature sensor 12 may be enclosed in metal casing, rather than being exposed to the open air. The etched foil strip shown in FIG. 2 is a convenient way to configure the heating element 2.

A graphite or graphite impregnated squeegee and/or rubber backing on the wiper blade 1 can be configured to have electrical power applied to heat the squeegee and/or backing. Using graphite would electrically heat and/or assist heat transfer to the wiper blade 1.

In beam-type wiper blades, there is a spring metal that is curved which follows the curve of the windshield. This metal can be substituted with carbon (graphite) that can be powered to produce heat for the wiper blade 1. Also, all of the metal brackets on current wiper blades can be made using graphite instead of metal. In other words, a non-metal blade can be heated by the electrical power of the motor vehicle.

Heated wire and/or etched foil heating tape can be embedded or extruded during the manufacturing process into the wiper bow, wiper blade backing and/or squeegee. The bow may be composed of metal, plastic, fiberglass and/or graphite. The backing and squeegee may be composed of rubber, embedded graphite, other materials, and/or other heat conducting materials.

A sensing and control module can be made for emergency vehicles of the type normally stored inside buildings that could be around 70° F. In applications such as this, the heated wiper blades 1 are preferably on and ready for use at all times. For example, if the air temperature is 70° F., a normal heated blade may get too hot if full power is supplied to the blade. Excessive power to the blades may cause the blades to get too hot, resulting in melting of rubber and/or plastic components. Thus, providing a module that reduces the electrical power supplied to the heating elements of the blades to ensure that the blades do not get too hot under such operating conditions is preferred for applications such as this. The module includes a temperature sensor that senses the higher temperature of the storage area, and provides a reduced voltage to the heated wiper blade 1 at higher (e.g., 70° F.) temperatures. For example, most vehicles consume 14.6 volts when started, or approximately 12.6 volts from the battery when the vehicle is not running. However, the heated wiper blade 1 may only require 10.0 volts for proper heat at 70° F. The control module may be configured to provide 11.0 volts if the temperature is 30° F., 13.0 volts at 0° F., 13.0 volts, etc. Similarly, the controller may be configured to shut off all electrical power to the blades if the air temperature exceeds 80° F. or other predefined temperature. This provides a completely automatic system or mode that allows the heated wiper blades to be left on at all times. PTC material, thermistor or thermostat, etc., can be utilized to accomplish this function as well.

Reducing electrical power at increased temperatures can also be accomplished to some extent by utilizing nickel 200 (referred to as PTC—Temperature Change with Resistance) material for the heating element 2. As the ambient (air) temperature goes down, the resistance of the heating element wire or etched foil decreases and the current increases, increasing the wattage of the heated wiper blade 1, thereby producing a higher temperature.

Figure 3:
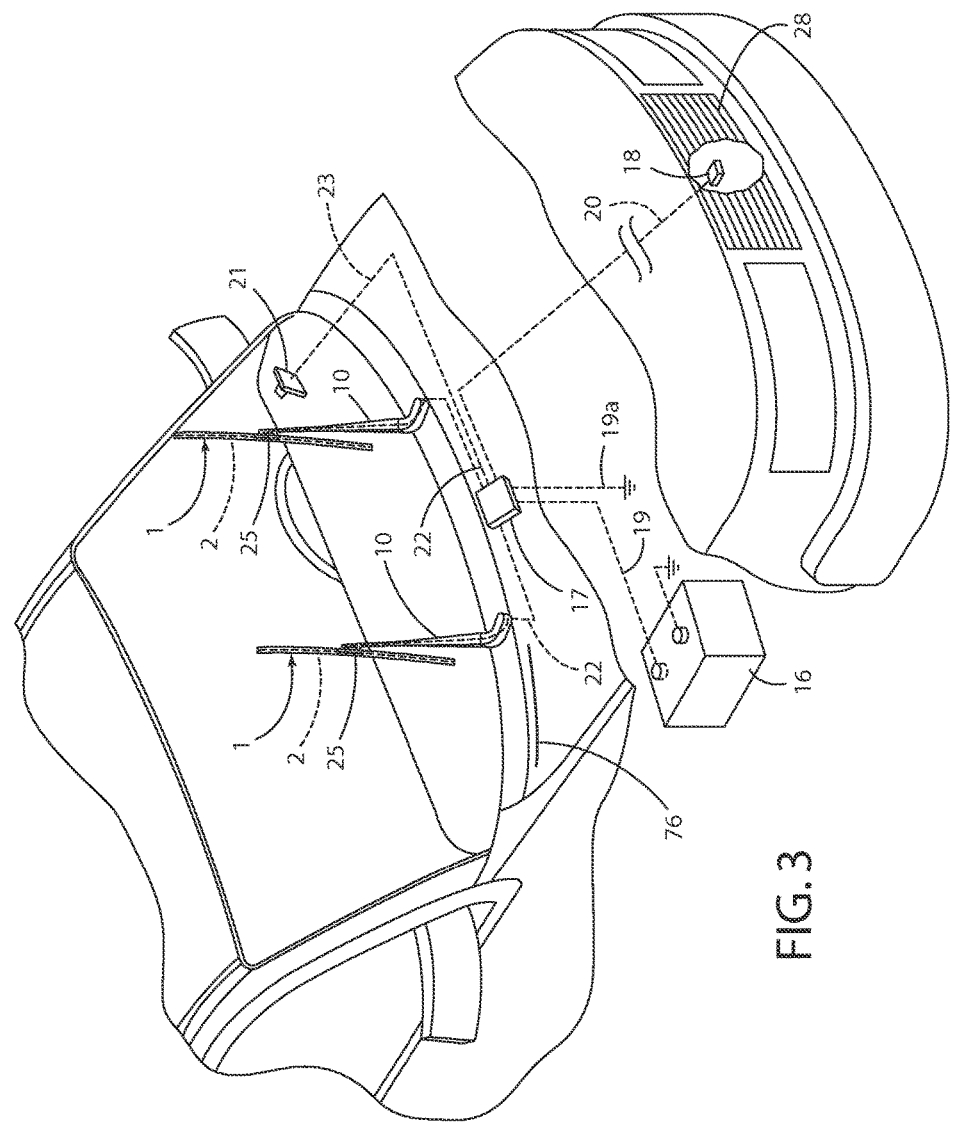
FIG. 3 is a partially fragmentary isometric view of a portion of a motor vehicle including a heated wiper blade assembly and system according to the present invention.

FIG. 1 illustrates another way of manufacturing and connecting power to the heated wiper blades. By making some or all of the parts of the blade assembly from a conducting material, such as graphite, supplying electrical power to such parts causes them to heat. In FIG. 1, center bracket 13, beam 14 and squeegee 15 are made of a conducting material. FIG. 1 also shows schematically how these components could be connected to the power source by leads 5 such that electricity flows through the components. It will be understood that the leads 5 may comprise insulated wire that is routed along the blade to bracket 13, and further routed along a wiper arms 10 (FIG. 3).

As discussed in more detail below, a wiring harness may be used to electrically connect the heated wiper blade to the electrical power source. The wiring harness can be made in various ways, including molded, different wiring devices, crimps, connectors, inline splices, twist connectors, waterproof connectors, plug-in connectors, and different wire lengths, sizes and colors. Different vehicles may need different wiring harnesses to accommodate various heated wiper blades. In some vehicle, like fire trucks, UPS trucks, bread trucks, etc., the wipers extend down from the bulkhead of the vehicle. This would require a different wiring harness with waterproof, ultraviolet-resistant wires and connectors.

All wires coming from the heated wiper blades are preferably flexible, ultraviolet-resistant (sun), oil-resistant, and be capable of carrying at least five amps of current. All harnesses going to the heated wiper blades also require a fuse.

A temperature sensor may also be included with the wiring harness. The wiring harness may also include a module and/or connectors that connect to the computer or processor associated with the vehicle, so that if the wires should fail or become disconnected, a warning light or signal would alert the driver. Also, fuse holders, inline fuses, on/off switches, etc., could be included with the harness.

With further reference to FIG. 3, the heated wiper blades 1 are mounted to existing arms 10 of a vehicle windshield wiper system. The heating elements 2 of blades 1 may be connected to wiring 22 utilizing disconnectable connectors 25. Alternately, the leads 5 of heating element 2 may be connected directly to wires 22. A manual switch 21 may be disposed in the vehicle interior for operation by a user. Switch 21 is connected to module 17 by a wire 23, and module 17 is connected to vehicle battery 16 by wire 19 and to vehicle ground by a wire 19a. A temperature sensor 18 may be mounted directly behind a vehicle grill 28 such that the temperature sensor 18 is exposed to ambient air during vehicle operation. As discussed in more detail below, temperature sensor 18 may comprise a thermal mass to prevent abrupt changes in the sensed temperature. Temperature sensor 18 is operably connected to module 17 by wires 20. Different control arrangements and wiring harnesses are discussed in more detail below.

Referring again to FIG. 2, heating element 2 includes first and second end portions 7a and 7b, respectively, each having a length "W". In general, if the overall length A of heating element 2 and blade 1 is 18 inches, B is preferably about 7.0 inches. If A is 21 inches, B is preferably about 8.5 inches. If A is 23 inches, B is preferably about 9.5 inches, and if A is 27 inches, B is preferably about 11.5 inches. Heating element 2 also includes a central portion 8 having a length "C", and first and second intermediate portions 9a and 9b, respectively, each having a length "B".

In the example illustrated in FIG. 2, the heating element 2 comprises a film 31 having a conductive element 30 disposed on the film 31. Connectors 25 may be disposed at the ends of leads 5 to provide for connecting and disconnecting leads 5 from wires 22 (see also FIG. 3) that operably connect the heating element 2 to battery 16 of the vehicle. Alternately, wiring 22 may be permanently connected to leads 5, and a suitable releasable connector may be provided at module 17. The conductor 30 may comprise etched foil comprising nichrome or other suitable conductive material. Conductor 30 is preferably comprises nickel 200 or other material having an electrical resistance that is greater at higher temperatures, and lower at lower temperatures. In general, such conductive materials are referred to herein as "Positive Temperature Coefficient" (PTC) materials. Use of a PTC conductor 30 provides for reduced heat production by the heating element 30 at higher ambient temperatures to thereby prevent overheating and damage to the blade assembly that could otherwise occur. Although the resistance of conductor 30 may vary depending upon the needs of a particular application, testing of a heated wiper blade 1 including a nickel 200 conductor 30 shows that conductor 30 may be configured to provide 1.4 Amps at 0° F., 1.74 Amps at 40° F., and 1.64 Amps at room temperature (approximately 72° F.). Thus, the use of a PTC material provides more amps (heat) at lower temperatures and less amps (heat) at higher temperatures even without a separate controller.

The film 31 may comprise a Kapton style ribbon/tape, a PET film, a heavy film, or other suitable film material. Furthermore, heating element 2 may comprise a silicone rubber sheet 31 having a conductor 30 disposed on the outside of the sheet 31, or the conductor 30 may be embedded in the silicone rubber sheet 31. It will be understood that the conductor 30 of FIG. 2 would appear in dashed lines if conductor 30 were imbedded in a silicone rubber sheet 31.

Still further, conductor 30 may comprise a wire heating element made of nichrome or nickel 200 or other suitable materials having an insulating cover or sheath comprising Teflon, PVC, or other suitable material. In general, Teflon is preferred due to its higher temperature capabilities. An example of a wire having a conductor 30 with an insulating outer cover or sheath is shown in FIG. 5a of U.S. Pat. No. 7,721,382

Conductor 30 may define a series of longitudinally extending portions 32 and transversely extending portions 33. The longitudinally extending portions 32 may have a reduced length at end portions 7a and 7b corresponding to the dimension "W", and also along the central portion 8 having a dimension "C". This provides a higher heat output in the regions 7a and 7b and c, relative to the intermediate portions 9a and 9b. The conductor 30 may provide a heat output that can be expressed in terms of heat energy per unit length of heating element 2. The closer spacing of transverse portions 33 of conductor 30 provides for substantially increased heat output per unit length at the end portions 7a and 7b, and also at the central portion C of heating element 2. Because the conductor 30 may not extend all the way to the opposite ends of beam 14, the additional heat provided in end portions 7a and 7b compensates for this and reduces build up of snow and ice at the opposite ends 4 of the wiper blade. Similarly, the increased heat provided by the closer spacing of longitudinal portions 32 of conductor 30 at the central portion C compensates for additional heat loss that may occur due to positioning of conductor 30 away from beam 14 at bracket 13. It will be understood that heating element 2 may provide increased heat output per unit length at only the center portion C, or at one or both of the end portions 7a and 7b, or at both the central portion C and the opposite end portions 7a and 7b.

With further reference to FIG. 2A, heating element 2 may comprise an elongated wire 35 that is disposed directly on an upper surface 36 of beam 14. Suitable retainers, adhesives, or clips 37 may be utilized to secure the wire 35 to the beam 14. The wire 35 of heating element 2 may comprise an elongated wire made of nickel 200, nichrome or other suitable conductive material that is encased in a sheath of insulating material such as PVC or Teflon. In general, wire 35 has an electrical resistance in the range of about 1-16 ohms per meter, depending upon the total length "A" of the beam 14, and the other requirements for a particular application.

Figure 2B:
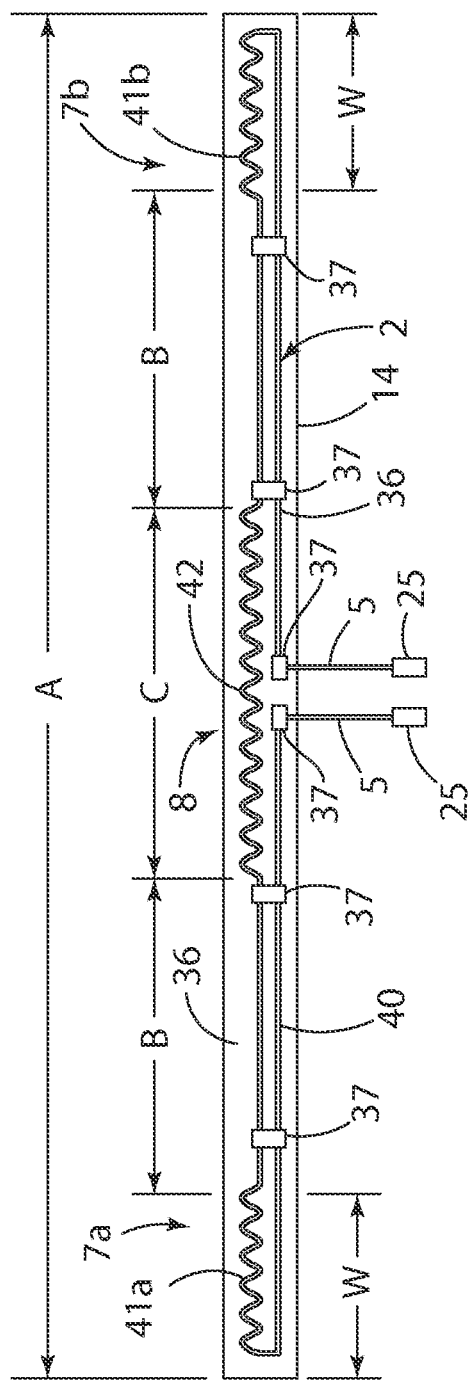
FIG. 2B is a partially schematic view of a beam and heating element according to another aspect of the present invention.

With further reference to FIG. 2B, heating element 2 may also comprise wires 40 that are secured to upper surface 36 of beam 14 utilizing clips 37, adhesive, or the like in a manner that is substantially similar to the arrangement discussed above in connection with FIG. 2A. Wire 40 may comprise an inner conductor made of nickel 200, nichrome, or other suitable material that is covered by an insulating material such as Teflon, PVC, or the like. In general, wire 40 may be substantially the same as wire 35 discussed above in connection with FIG. 2A. Wire 40 may include portions 41a, 41b, and 42 providing increased heat output per unit length of the blade at opposite end portions 7a, 7b, and at central portion 8. Portions 41a, 41b, and 42 may comprise a sine wave or the like providing increased heat per unit length at the opposite ends and central portions of the heating element 2 of FIG. 2B.

Figure 2C:
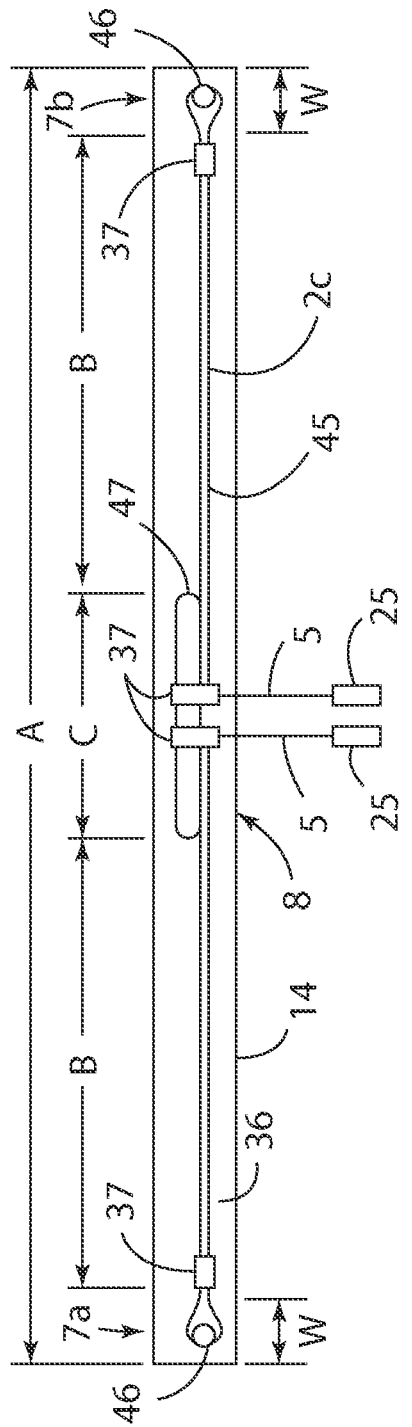
FIG. 2C is a partially schematic view of a beam and heating element according to another aspect of the present invention.

With reference to FIG. 2C, a heating element 2C corresponding to another aspect of the present invention includes a wire 45 that is secured directly to upper surface 36 of beam 14 utilizing clips 37 or other suitable connectors such as adhesives, or the like. Wire 45 may be substantially the same as wires 35 and 40 discussed above in connection with FIGS. 2A and 2B, respectively. Wire 45 may form one or more additional loops 46 providing additional heat output at end portions 7a and 7b, and one or more additional loops 47 at central portion 8. It will be understood that a single loop 47 may be utilized with a U-bend end 38 (FIG. 2A), or wavy portions 41a and 41b (FIG. 2B). Similarly, the additional loops 46 (FIG. 2C) may be utilized in conjunction with a wire having a straight central portion (FIG. 2A), or a wavy central portion 42 (FIG. 2B). Also, any combination of the features shown in FIGS. 2, 2A, 2B, and 2C may be utilized to provide additional heat at only the opposite ends 7a and 7b, only the central portion 8, or at the end portions 7a and 7b and central portion 8.

Figure 4:
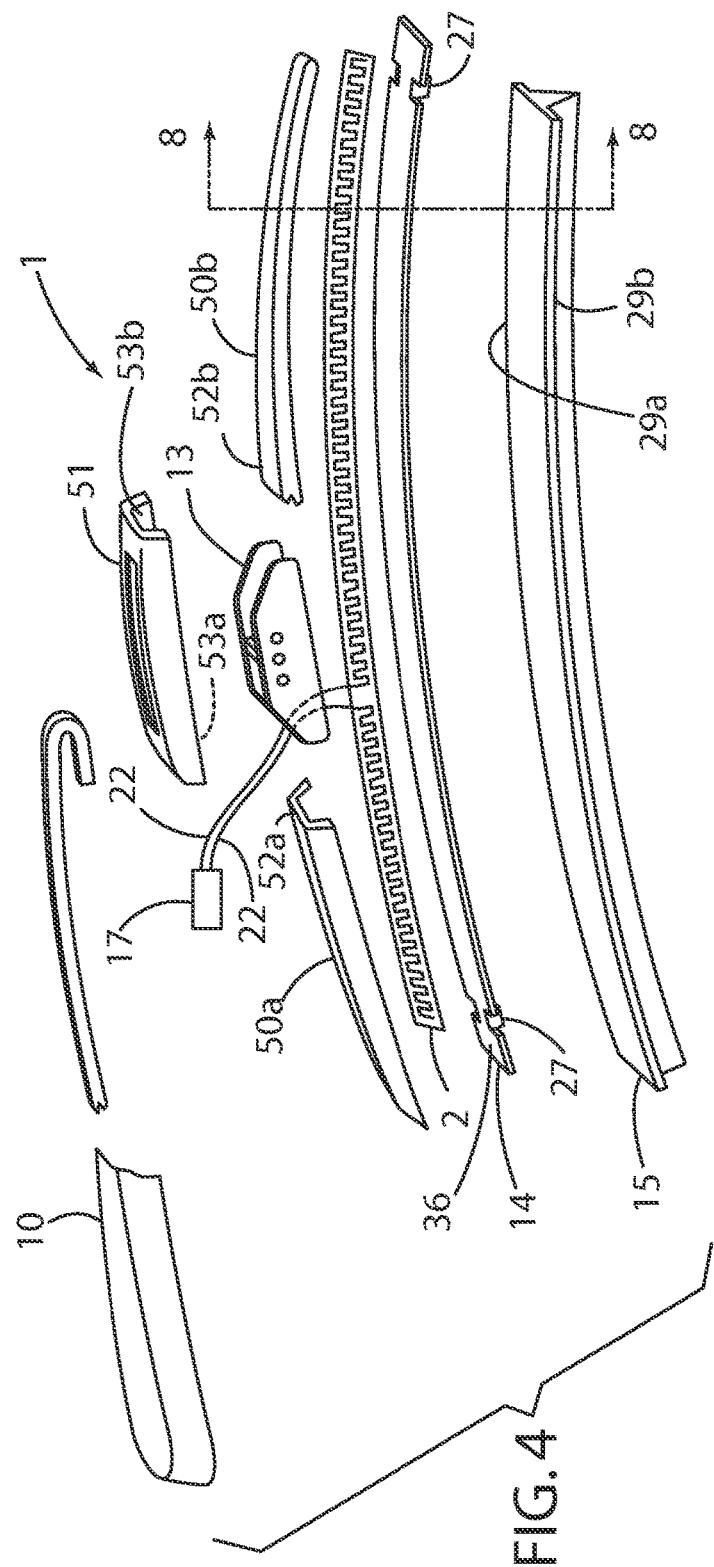
FIG. 4 is a partially fragmentary, exploded isometric view of a heated wiper blade according to one aspect of the present invention.
Figure 5:
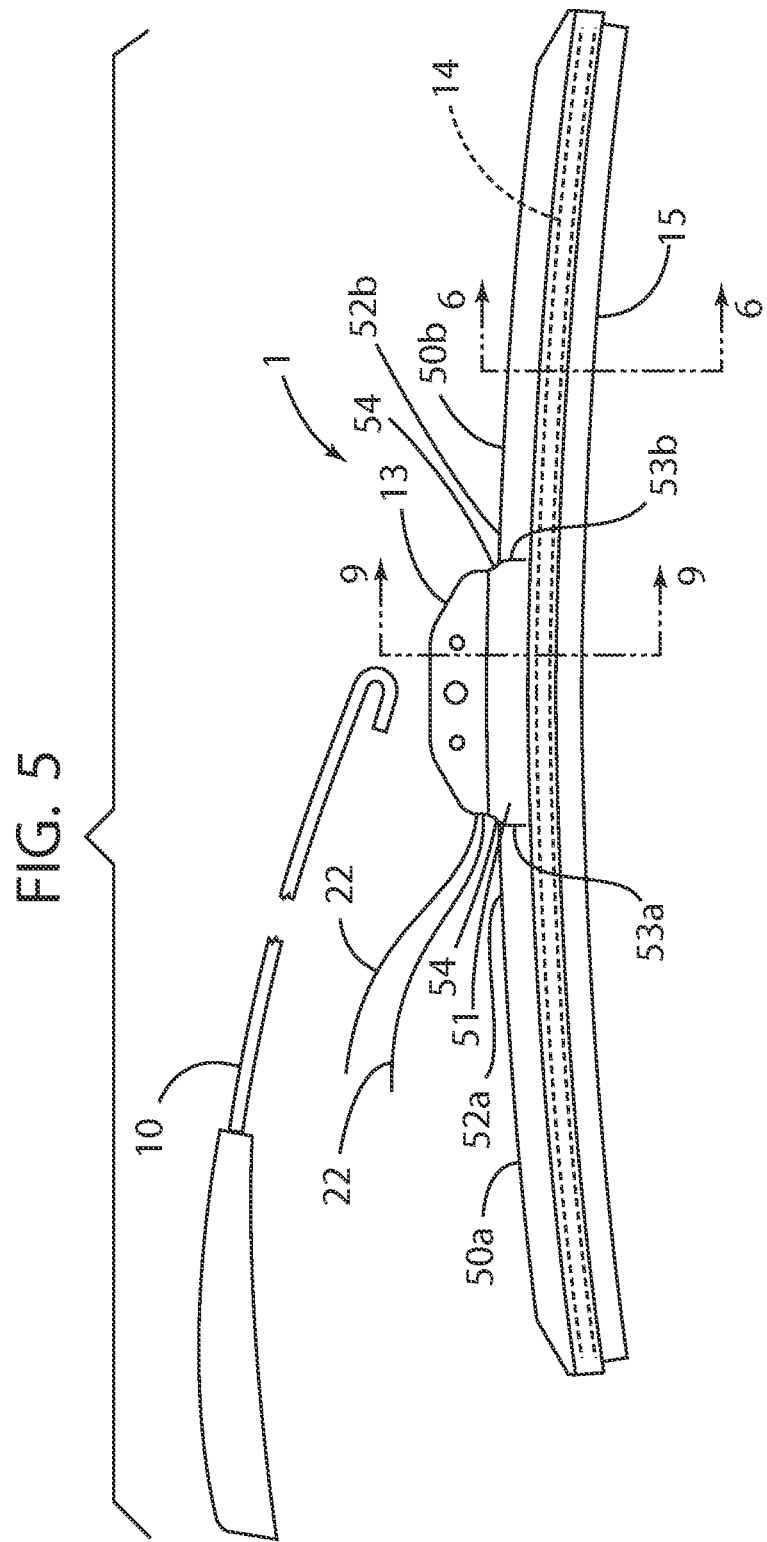
FIG. 5 is a partially fragmentary side elevational view of the heated wiper assembly of FIG. 4.
Figure 8:
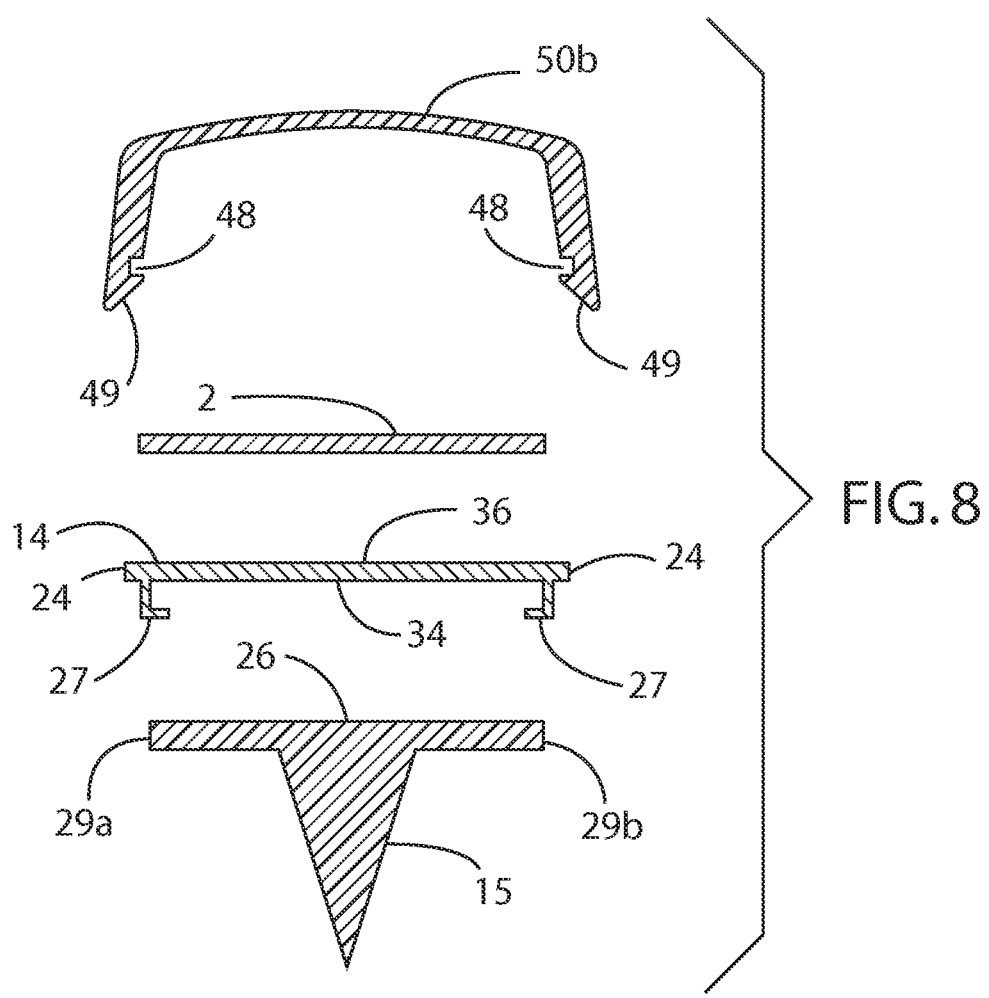
FIG. 8 is an exploded view of the heated wiper blade of FIG. 7.

With further reference to FIGS. 4 and 5, heated wiper blade 1 may comprise a beam-type wiper blade having beam 14 and squeegee 15 that is connected to beam 14. Beam 14 may include tabs 27 (see also FIG. 8) that extend around opposite edges 29a of squeegee 15 to thereby secure beam 14 to squeegee 15. Other suitable connecting arrangements may also be utilized. Heated wiper assembly 1 also includes elongated covers 50a and 50b, a central cover 51, and a bracket 13 that is utilized to interconnect the heat wiper blade 1 with an existing arm 10 of a vehicle wiper system. The beam 14, squeegee 15, covers 50a, 50b, and 51, as well as bracket 13 may be substantially similar to commercially available beam type wiper blades. The covers 50a and 50b and 51, as well as squeegee 15 are preferably made of materials that can withstand 200-300° F. Similarly, adhesives, sealants, filler material, and the like also preferably comprise materials that can withstand temperatures of 200-300° F. In general, beam-type blades made by various manufacturers are readily available from various retail outlets. The covers, beam, and squeegee will therefore not be described in detail herein, except as necessary to describe the differences between the heated wiper blade 1 of the present application and commercially available non-heated beam type wiper blades.

Wiper assembly 1 (FIGS. 4 and 5) further includes heating element 2 which may be in direct contact with upper surface 36 of beam 14 as described above in connection with FIGS. 2, 2A, 2B, and 2C. Heating element 2 may comprise any one of the heating elements described in more detail above in connection with FIG. 2, 2A, 2B, or 2C. As discussed above, heating element 2 may be connected to a module 17 utilizing wiring 22. It will be understood that some of the components of the wiring harness are not shown in FIGS. 4 and 5. When assembled, inner ends 52a and 52b of covers 50a and 50b respectively, are received in openings 53a and 53b of cover 51. Wiring 22 may pass through opening 53a or opening 53b, and a heat resistant sealant 54 (FIG. 5) may be provided at openings 53a and 53b to provide an airtight seal between covers 50a, 50b, and cover 51. The heat resistant sealant 54 is also utilized to provide an airtight seal around wires 22 where they enter opening 53a or 53b.

Figure 6:
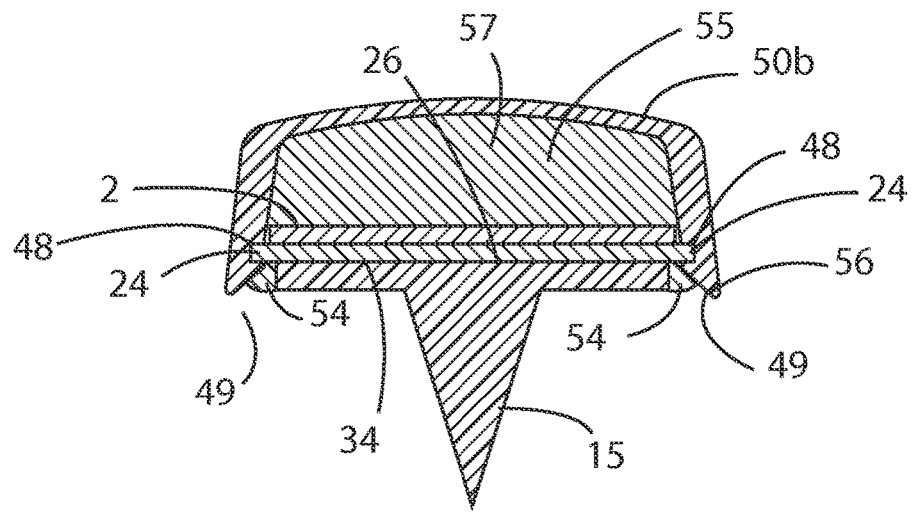
FIG. 6 is a cross-sectional of the heated wiper blade of FIG. 5 taken along the line 6-6.

With further reference to FIG. 6, a cavity 55 (see also FIG. 7) is formed by covers 50a and 50b. Heating element 2 is disposed in cavity 55. Sealant 54 is utilized at edges 56 of cover 50b to provide an airtight connection between cover 50b, squeegee 15 and/or beam 14 such that cavity 55 is substantially airtight. Edge portions 56 of covers 50a and 50b preferably include a tapered wedge-like surface 49 and a pair of inwardly facing longitudinal grooves 48 (See also FIG. 8). During assembly, beam 14 is pushed into engagement with covers 50a and 50b such that opposite edges 24 of beam 14 engage tapered edges 49, and then snap into inwardly-facing grooves 48 (See also FIG. 8). A sealant 54 or the like is preferably disposed around the opposite side edges of heating element 2 and/or beam 14 and/or squeegee 15 to provide an airtight seal as discussed below, sealant 52 may be disposed inside covers 50a, 50b, and 51 (FIGS. 4 and 5). Covers 50a and 50b, beam 14, squeegee 15, heating element 2, and sealant 54 are preferably made of materials that are selected to withstand 200-300° F. Sealant 54 is preferably a high temperature sealant that does not degrade at the higher temperatures generated by heating element 2. The squeegee 15 is adhesively adhered, or otherwise mechanically connected, directly to beam 14 whereby upper surface 26 of squeegee 15 is in direct contact with lower surface 34 of beam 14 to thereby facilitate heat transfer therebetween. This also facilitates faster, more efficient assembly.

Figure 7:
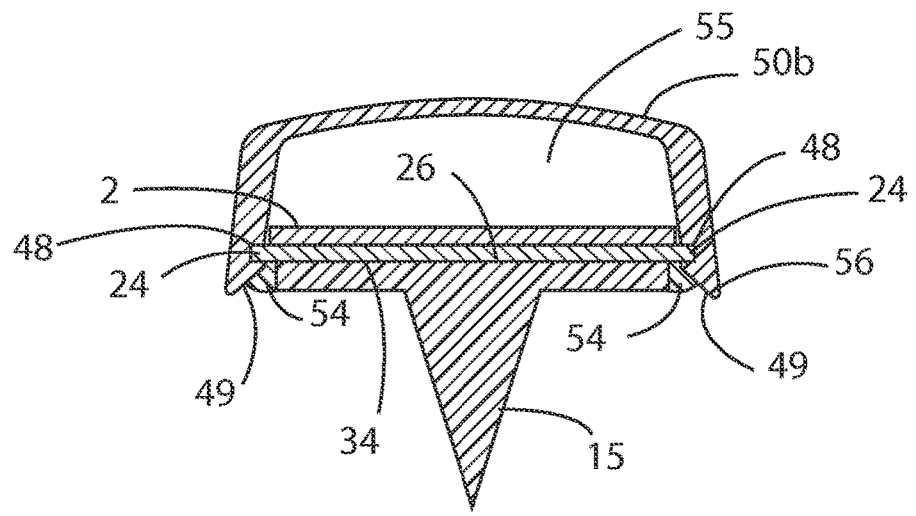
FIG. 7 is a cross-sectional view of the heated wiper blade according to another aspect of the present invention.

Cavity 55 may comprise an empty cavity as shown in FIG. 7, or sealant 52 or a filler material 57 (FIG. 6) may be injected into cavity 55. Filler material 57 may comprise a flexible sealant material that is capable of withstanding the higher temperatures resulting from heating element 2. In general, filler material 57 may be injected into cavity 55 in a liquid or highly viscous form, and the filler material 57 then cures to form a solid mass. Alternately, covers 50a and 50b may comprise a relatively hard outer layer and filler material 57 that defines an inner core formed at the time the covers 50a and 50b are fabricated. The shell and core 57 may be formed utilizing a molding process or the like. The filler material 57 is significantly softer than the outer layer of the shell. During assembly, the covers 50a and 50b (with filler material 57) are snapped onto the beam as described above. The filler material 57 pushes down on the heating element 2 and causes the heating element to contact upper surface 36 of beam 14, thereby ensuring that heat from heating element 2 is transferred into beam 14. Filler material 57 also insulates the upper side of the wiper blade to prevent heat loss. The outer shell and the core filler material 57 may comprise rubber having significantly different hardnesses, or the outer shell and the core may comprise different materials. For example, the shell could comprise a relatively hard plastic, and the core could comprise an elastomeric rubber. Also the outer shell is preferably very smooth to prevent excessive buildup of snow and ice on the outside of wiper blades. Filler material 57 provides insulating properties such that more of the heat from heating element 2 is transferred to the beam 14 and to squeegee 15.

Figure 9:
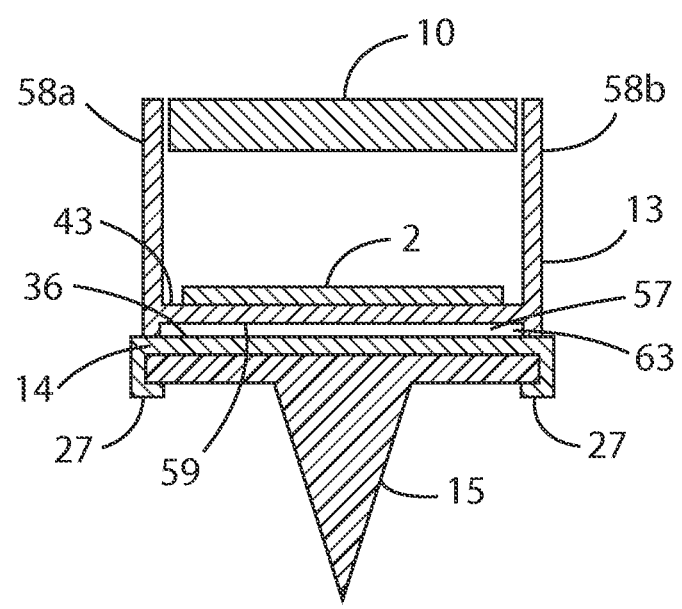
FIG. 9 is a cross-sectional view of the heated wiper blade of FIG. 5 taken along the line 9-9.

With reference to FIG. 9, bracket 13 may have a generally U-shaped cross section with a lower flange or sidewall 59 and upwardly extending flanges 58a and 58b. Lower flange 59 may be spaced apart from the upper surface 36 of beam 14 to form a gap 63. However, the gap 63 may be too small to allow heating element 2 to be positioned therein between lower flange 59 and beam 14. Thus, heating element 2 may be disposed in direct contact with the upper surface 43 of lower flange 59 of bracket 13. Gap 63 may be filled with filler material 57 to thereby provide increased heat transfer from flange 59 to squeegee 15 adjacent bracket 13.

Figure 10:
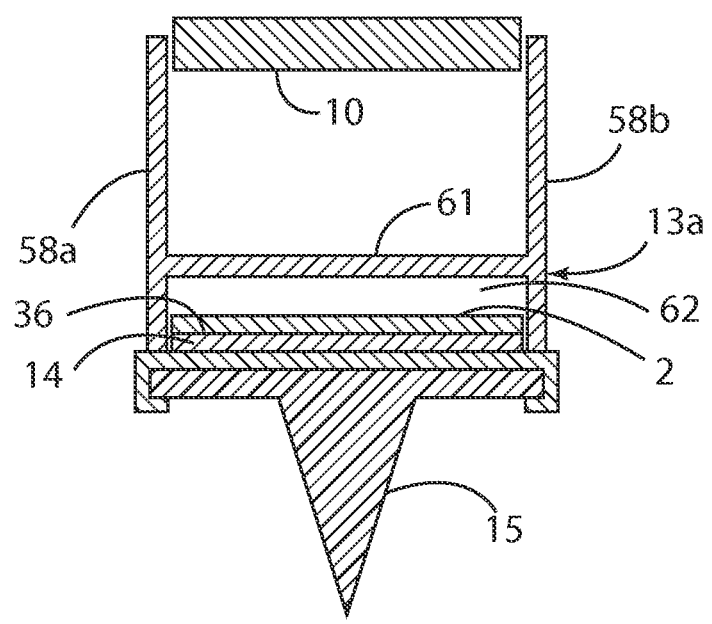
FIG. 10 is a cross-sectional view of another version of the heated wiper blade of FIG. 9.

With further reference to FIG. 10, heating element 2 may be disposed between lower flange or wall 61 of bracket 13a and beam 14 if a modified bracket 13a (see also FIG. 11) permit this configuration.

Bracket 13a comprises a pair of generally upright side flanges 58 and 58b that are interconnected by an internal web or sidewall 61 or the like to form a gap 62 that is large enough to receive heating element 2. Modified bracket 13a permits heating element 2 to be disposed in direct contact with upper surface 36 of beam 14 where beam 14 extends through or adjacent bracket 13 to thereby facilitate heat transfer from heating element 2 to beam 14 or 14a and to squeegee 15 (see also FIG. 11).

With further reference to FIGS. 11 and 12, the beam may comprise a beam 14a having a substantially flat central portion 64, and curved outer portions 65a and 65b. In general, conventional beams 14 as shown in FIG. 4 have a uniform radius of curvature. This can tend to cause a gap between squeegee 15 and the windshield when the squeegee 13 is sliding over a portion of the windshield having less curvature. The straight or flat central portion 64 of beam 14a ensures that the central portion of squeegee 15 stays in contact with the windshield surface. Also, straight or flat portion 64 reduces flexing of beam 14a in operation, thereby reducing the tendency for heating element 2 to flex and break if heating element 2 is made from a material that cannot withstand repeated flexing. In general, the overall nominal length "A" of heating element 2 may be 18 inches, 21 inches, 23 inches, or 27 inches. The beam 14 is typically about one inch longer than heating element 2. The dimension "D" of flat central portion 64 of beam 14a is preferably about 3-10 inches (depending in part, on the dimension "A", and curvature of the windshield). In a preferred embodiment, the dimension "D" is about 4.5 inches. However, it will be apparent that the precise dimension of flat central portion 64 is not necessarily critical in all applications.

Beams 14 and 14a may be formed from flat strips of metal by stamping or other such suitable process. In general, the curved outer portions 65a and 65b of beam 14a have a radius of curvature that is similar to beam 14 (see also FIG. 4). The flat central portion 64 can be created from flat metal stock by curving only end portions 65a and 65b during the stamping or other forming process.

Beams 14 and 14a may be made from spring steel or other suitable metal. Alternately, beams 14 and 14a may be formed from graphite, fiber glass, or a suitable polymer material. Furthermore, as noted above in connection with FIG. 1, the beams 14 and 14a may be made from a conductive material such that the beam 14 or 14a itself acts as a heating element as described above in connection with FIG. 1. If the beam 14 or 14a is used as a heating element, a separate heating element 2 is not required. Referring again to FIG. 4, other components of wiper blade assembly 1 such as the covers 50a, 50b, 51, and bracket 13 may also be made of a conductive material and operably interconnected with an electrical power source whereby these components also provide a heating function. In general, these components may be made of a metal conductive material or they may comprise a conductive plastic material. Conductive plastic material may comprise a plastic resin that has been embedded with carbon powder or fiber to reduce the electrical resistivity of the plastic material. Plastic that has been formulated with stainless steel fiber, inherently dissipative polymer, or other such materials may also be utilized.

Beams 14 and 14a may comprise an extruded polymer material, and conductor 30 may comprise an etched foil heating tape that is imbedded or extruded into the beam 14 or 14a. Conductors 30 may be extruded into the beam 14 or 14a. The spring beam may also comprise a carbon fiber material with conductor 30 extruded therein. The conductor 30 may comprise a nickel 200 material, nichrome, or other suitable resistance material. Leads 5 interconnect conductors 30 with the other wiring in the system. Leads 5 may protrude transversely from flat center portion 64, or from opposite ends 4a of beam 14a.

Heated wiper blade 1 may comprise a beam-type wiper having a pair of spring steel spines that connect to an elongated blade as shown in U.S. Pat. No. 7,721,382. The beam 14 may comprise a slotted elastic member as disclosed in U.S. Patent Publication No. 2006/0026786, the entire contents of which are hereby incorporated by reference. If the squeegee has an upper surface that is above the upper surface of the beam or beams (i.e. the beams are received in slots on opposite sides of the squeegee), the heating element may be secured directly to the upper surface of the squeegee utilizing adhesive, adhesive sealant, or the like to ensure that heat from element 2 is transferred into the squeegee.

Figure 13:
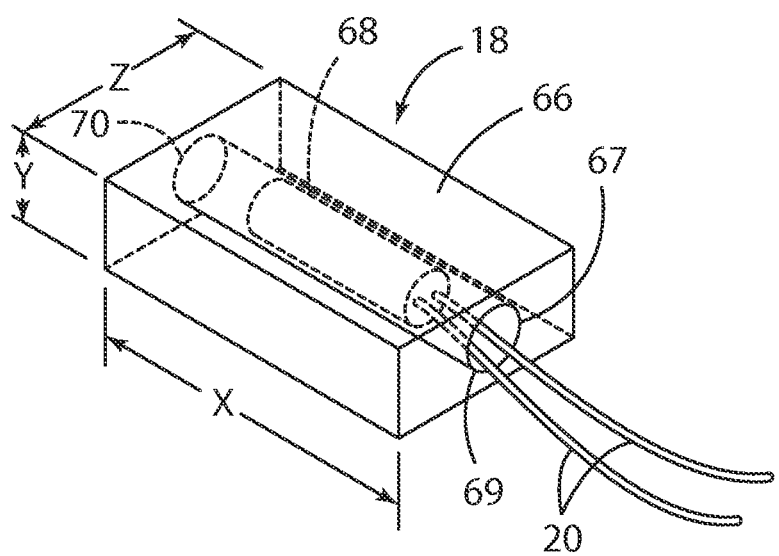
FIG. 13 is an isometric view of a temperature sensing unit.

With further reference to FIG. 13, temperature sensor 18 may comprise a block 66 that is made of aluminum or other material having significant thermal energy storage capabilities. A hole or bore 67 is formed in block 66, and a sensor element 68 is positioned in the bore 67 with wires 20 extending out of bore 67. Sealant 69 may be disposed in bore 67 to provide a watertight seal around wires 20 and to retain sensor element 68 in bore 67. If bore 67 extends all the way through block 66 to form an open end 70, the open end 70 may also be filled with sealant 69. Block 66 has a length X, a height Y, and a width Z. In general, the dimensions X, Y, and Z are chosen to insure that block 66 has sufficient thermal mass to prevent rapid temperature fluctuations of sensor element 68. If the block 66 is made of aluminum, the length X may be about 1.5 inches, and the height and width may be about 1 inch. Block 66 may be various shapes, including cylindrical, or other suitable shapes.

Figure 14:
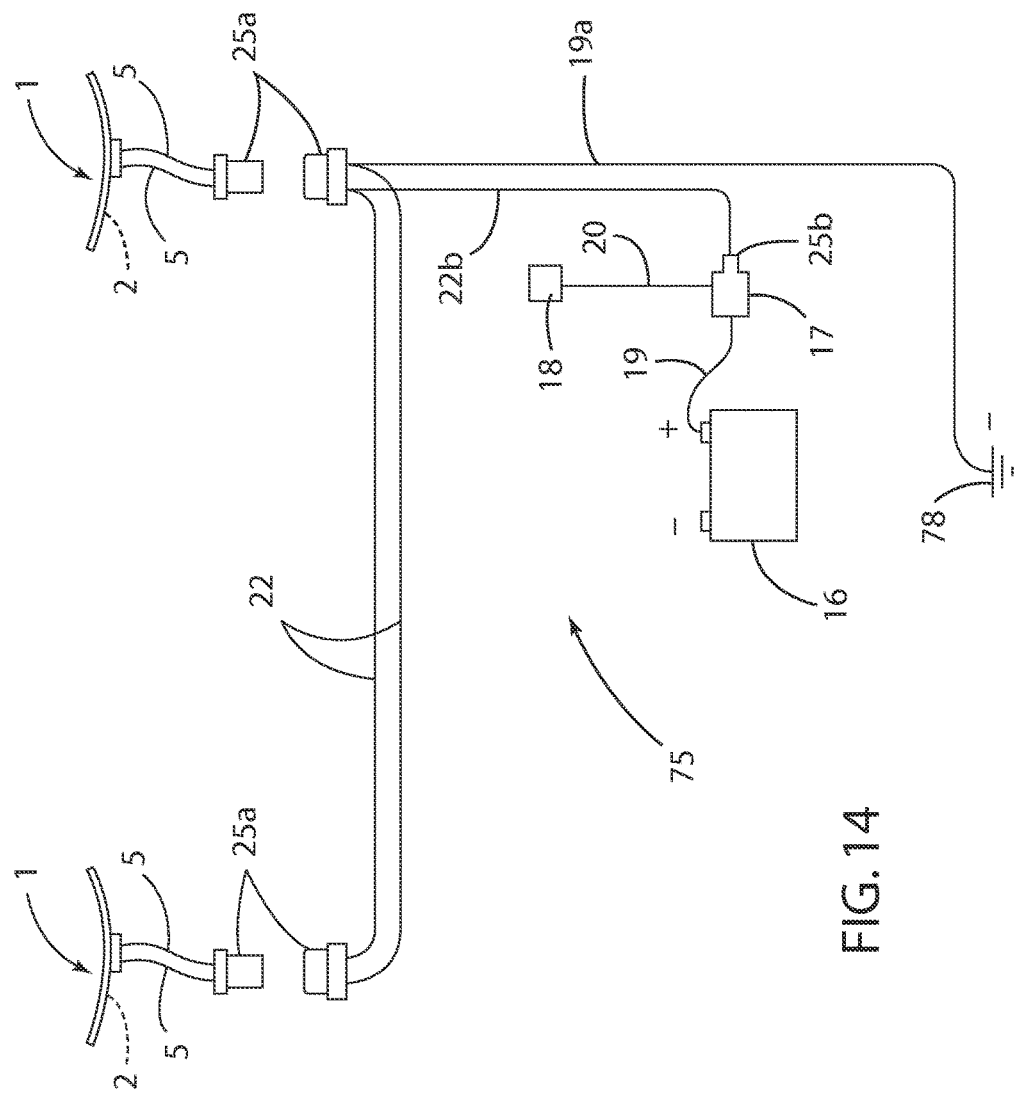
FIG. 14 is a partially schematic view of a first wiring harness.
Figure 15:
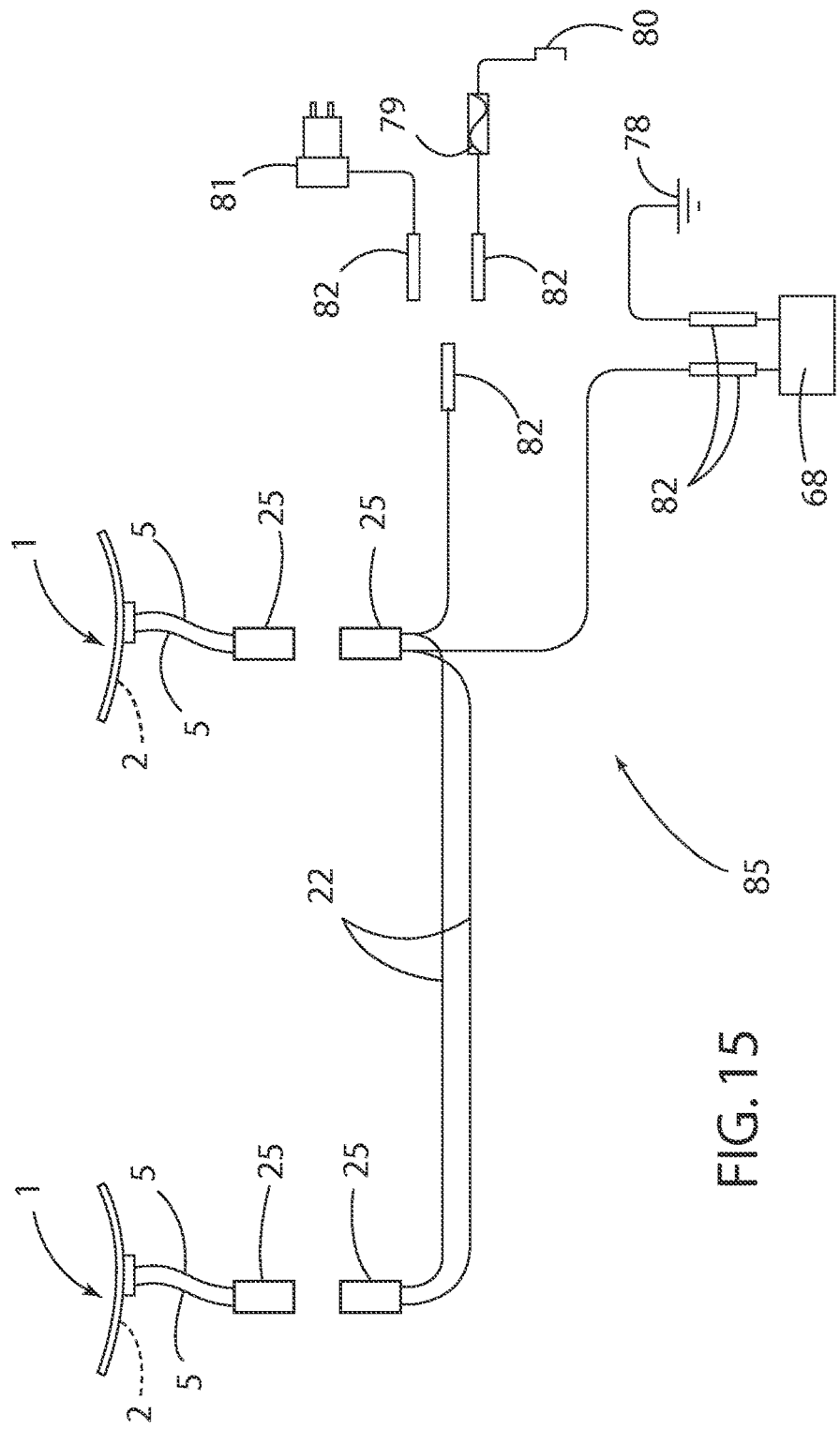
FIG. 15 is a partially schematic view of a second wiring harness.

With reference to FIG. 14, a wiring harness 75 includes a battery 16, a module 17, a temperature sensor 18 and connectors 25a that releasably interconnect wiring 22 with leads 5 of heating elements 2 of heated wiper blades 1. The electrical connectors 25a may be positioned adjacent an end of arm 10 (see also FIG. 3). If the heated wiper blade assemblies 1 are retrofitted to a vehicle, the module 17 temperature sensor 18, and wiring 19, 22, and 23 may be installed in a vehicle, and connectors 25a may be utilized to releasably interconnect harness 75 with heated wipers 1. If one of the heated wipers 1 requires replacement, it can be quickly and easily disconnected and replaced by disconnecting a connector 25a from the wiper blade being replaced, followed by interconnecting of connectors 25a to the replacement blade 1. In this way, once a vehicle has been retrofitted with the wiper system, only the blade portion of the system needs to be replaced in the event one of the heated blades 1 does not function properly. Alternately, a single connector 25b and wire 22b may be utilized to interconnect wiring 22 with module 17. Connectors 25a and/or 25b are preferably waterproof, 7 amp rated connectors having a very small external size to reduce the visual effects of connector 25a. Furthermore, if connector 25b is very small, a hole in seal 76 (FIG. 3) can be formed, and connector 25b can be passed through the hole. If required, sealant can be applied around the hole through seal 76. This reduces disruption of the seal around the vehicle hood.

A wiring harness 85 is similar to the wiring harness 75 of FIG. 14, further includes a connector 81 that may be utilized to interconnect the wiring harness to a vehicle fuse box. Alternately, a fuse 79 and fuse clip 80 may be utilized. The portions of wiring harnesses 75 and 85 that are subject to flexing during use (i.e., the portions directly adjacent arms 10) are preferably made of a flexible wire that retains its flexibility to at least −40° C. and more preferably retains its flexibility to −60° C.

All of the connectors, wire splices, butt splices, and other components of the wiring harness are preferably moisture and water proof. Furthermore, all of the wire and connectors preferably meets automotive specification such as TXL wire for portions of the wire that are disposed in the engine compartment below the hood of the vehicle. The wires going to the wiper blades 1 are preferably about 0.125 inches in diameter, and not less than 40 inches long, flexible, remaining flexible to −65° F. As discussed above, the wires can be connected at the wiper blades 1, or under the hood of a vehicle. If the connectors are located under the hood there is less chance of damage to the connectors from car washes, wind, or the like. Also, as discussed above, the wire running to the wiper blades 1 would be replaced with the wipers if an under hood connection is utilized. However, providing a connector at the wiper generally provides for a lower cost wiper blade, and facilitate replacement of in general, the system is configured to provide power to the heated wiper blades 1 only if the vehicle ignition switch is on. Furthermore, the electrical system is grounded on the wiper arms 10, such that only a positive lead wire needs to be run under the hood of a vehicle.

Figure 16:
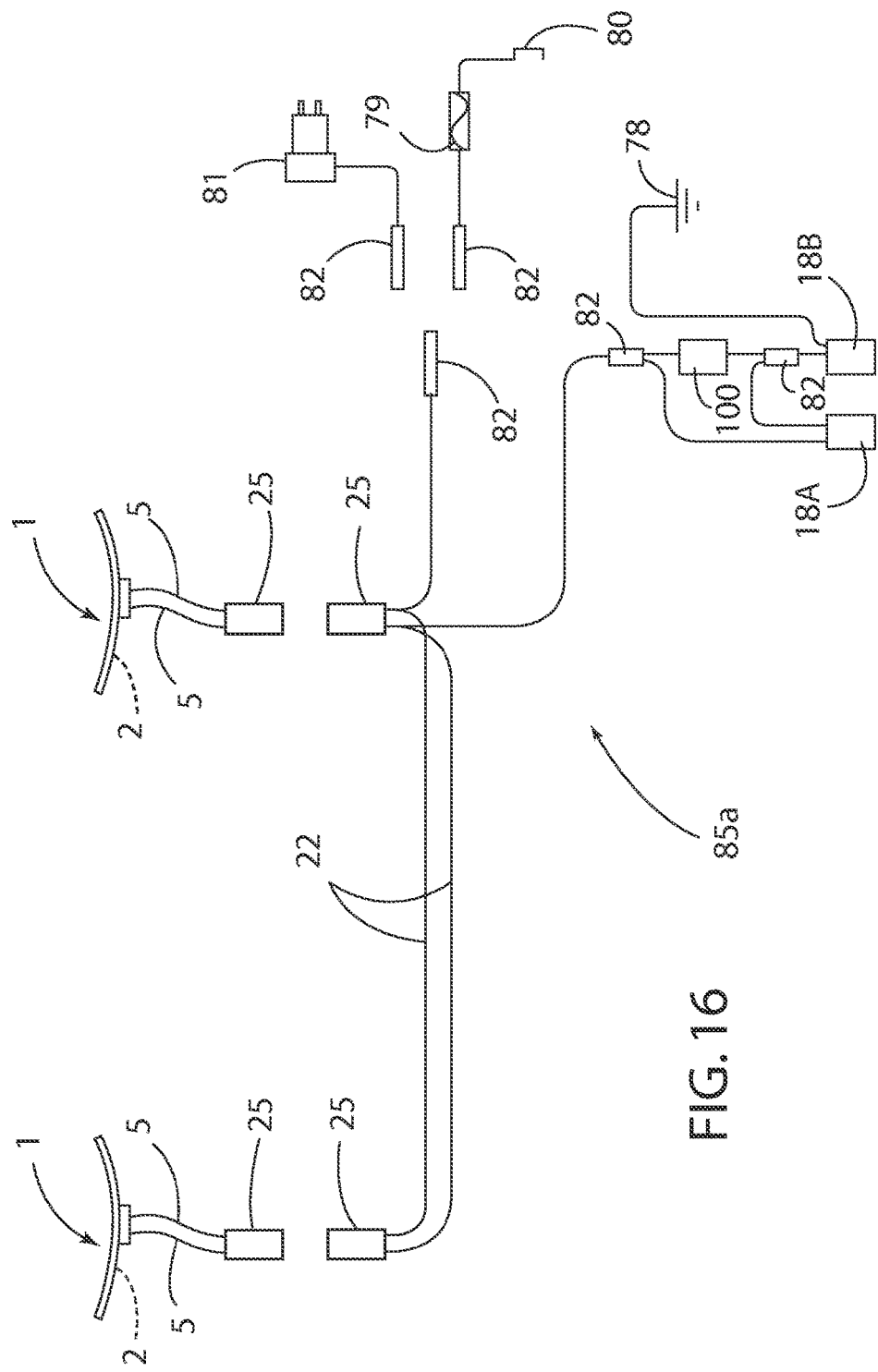
FIG. 16 is a partially schematic view of a third wiring harness.

Module 17 may be configured to control the amount of electrical current supplied to heating elements 2 based on an ambient temperature sensed by temperature sensor 18. Module 17 is configured in part, to account for the material utilized to make the heating element 2. With reference to FIG. 16, module 17 may comprise sensors 18a and 18b. First sensor 18A closes at approximately 0° F., and the sensor 18B closes at approximately 40° F. The 40° sensor 18B has a dropping resister 100 that reduces the voltage to approximately 10.6 volts from the 13.6 volts provided by a vehicles alternator during operation. Thus, the circuit causes less voltage and heat at the blade when the temperature exceeds 0° F. Although the 10.6 volt provides good operation in the temperature range of 0° F. to 40° F., additional heat is required when the operating conditions are below about 0° F. When the ambient temperature is 0° F. or lower, the second sensor 18B bypasses the dropping resister 100 whereby the heating element 2 of the wiper receives 13.6 volts. When 13.6 volts is supplied to the heating element 2, the wiper blade assembly 1 can be operated at temperatures between about −40° F. and 0° F., while preventing excessive heat (and attending damage) at operating temperatures from about 0° F. to about 40° F.

Module 17 may alternately comprise a Pulse Width Modulator (PWM) that is supplied with the vehicle at the time it's manufactured, or retrofitted to a vehicle. PWM may also comprise an aftermarket unit that is retrofitted to a vehicle, and may be used with our without PTC sensor/heating element, or other sensing means. Furthermore, a vehicle may include a temperature sensor at the time it is manufactured. If the vehicle includes a PWM and a temperature sensor, module 17 can be configured to control voltage to heating element 2 to account for ambient operating conditions. For example, the PWM may be configured to provide electrical current to heating element 2 when the ambient temperature is 40° F. or lower, and the electrical current may be supplied to the heating element 2 until a temperature inside the blade as sensed by a temperature sensor exceeds about 150° F., at which point the PWM provides reduced current to prevent overheating of the heating element 2 and other components. As the temperature of the blade drops, the PWM provides less current (fewer pulses) until the temperature stays at approximately 150° F. even if the ambient temperature is −40° F.

If the heating element 2 does not include a positive thermal coefficient heating element, module 17 may include a voltage regulator. For example, module 17 may be configured to provide 8 to 10 volts to the heating element 2 when the ambient temperature is 40° F. As temperatures drop below 40° F., the module 17 is configured to regulate the voltage up to 13.6 volts.

If a PTC conductor 30 is used, the resistance of the PTC conductor 30 is selected such that at an ambient temperature of 40° F. and 8 to 10 volts, the blades do not exceed a predetermined maximum temperature, but rather stay at approximately 125-150° F. The proper resistance level for the heating element 2 can be determined by testing different conductors (ohms/meter), until the proper resistance level is found to provide a temperature at the exterior of the blade of approximately 125-150° F. when the ambient temperature is −40° F. The specific resistance level of the conductor 30 will generally depend on the configuration of the various components such as the beam 14, covers 50a and 50b, as well as the presence or absence of filler material 57 (FIG. 6). As discussed above, in general conductor 30 will have a resistance in the range of approximately 1-16 ohms per meter if conductor 30 comprises a wire having a conductive element made from PTC material such as nickel 200 or other conductive material. and an insulating sheath made of Teflon, PVC, or the like. At temperatures below 40° F., the coefficient of electrical resistance of the conductor 30 is reduced if a PTC material is used, thereby providing increased heat from the conductor 30 such that the exterior surfaces of the wiper blades 1 stays at approximately the same temperature without requiring a separate controller and temperature sensor.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A frameless heated wiper blade assembly for vehicle windshields, comprising:
   a continuous elongated curved beam substantially defining a longitudinal length and a width of the frameless heated wiper blade assembly and comprising a flexible material suitable for conforming to a curved windshield, the continuous elongated curved beam defining oppositely facing upper and lower surfaces, a central portion, first and second opposite ends, first and second opposite end portions that are directly adjacent the first and second opposite ends, respectively, a first intermediate portion extending between the first opposite end portion and the central portion and a second intermediate portion extending between the central portion and the second end portion;
   an elongated flexible squeegee attached to the continuous elongated curved beam;
   a bracket connected to the central portion of the continuous elongated curved beam, wherein the bracket is configured to releasably connect the heated wiper blade assembly to an arm of the vehicle windshield wiper system;
   an electrical resistance heater comprising an elongated electrical conductor that produces heat when electrical current is passed through the electrical conductor, wherein the electrical resistance heater is disposed directly adjacent the upper surface of the continuous elongated curved beam, and wherein the electrical conductor comprises an elongated wire that is encased in a sheath of electrically insulative material and the electrical conductor defines an electrical resistance that varies with changes in temperature, whereby the electrical resistance heater provides significantly more heat energy at lower temperatures; and
   a cover extending over portions of the electrical resistance heater that are directly adjacent the first and second opposite ends and the first and second intermediate portions of the continuous elongated curved beam to thereby prevent direct exposure of the electrical resistance heater to air moving adjacent a vehicle in use.

2. The frameless heated wiper blade assembly of claim 1, wherein the electrical resistance heater comprises nickel 200.

3. The frameless heated wiper blade assembly of claim 1, wherein
   the electrical conductor comprises a plurality of transverse portions that extend transverse relative to the longitudinal length.

4. The frameless heated wiper blade assembly of claim 3, wherein:
   the transverse portions are substantially linear, and wherein the electrical conductor includes a plurality of substantially linear longitudinal portions extending generally parallel to the longitudinal length and interconnecting the transverse portions.

5. The frameless heated wiper blade assembly of claim 1, wherein:
   the electrical resistance heater comprises a thin flexible film, and the conductor comprises a foil disposed on a side face of the film.

6. The frameless heated wiper blade assembly of claim 1, wherein:

the continuous elongated curved beam includes a generally linear portion at a center of the continuous elongated curved beam and first and second elongated curved portions extending outwardly away from the linear portion in opposite directions.

7. The frameless heated wiper blade assembly of claim 6, wherein the continuous elongated curved beam is made from metal having a substantially uniform thickness and width.

8. The frameless heated wiper blade assembly of claim 1, wherein:

the central portion defines a center of the continuous elongated curved beam; and wherein:

the bracket defines a lower surface that is spaced apart from the upper surface of the continuous elongated curved beam to define a gap therebetween, and wherein the electrical resistance heater extends through the gap.

9. The frameless heated wiper blade assembly of claim 1, wherein the electrical resistance heater is deposed in an elongated cavity defined in part by an inner surface of the cover and the elongated cavity defined in part by an inner surface of the cover is substantially filled with a material that encases the electrical resistance heater.

10. The frameless heated wiper blade assembly of claim 1, wherein the electrical resistance heater is deposed in an elongated cavity defined in part by an inner surface of the cover and the elongated cavity is substantially empty.

11. The frameless heated wiper blade assembly of claim 1, wherein:

the continuous elongated curved beam defines elongated opposite side edges; and the cover is generally U-shaped in cross section with flexible side walls, the cover comprising a pair of inwardly facing grooves extending along edges of the cover and tapered edge surfaces adjacent the grooves, whereby the cover can be snapped onto the continuous elongated curved beam by pushing the cover onto the continuous elongated curved beam until the opposite edges of continuous elongated curved beam are received in the grooves of the cover.

12. The frameless wiper blade assembly of claim 1, wherein: the central portion of the continuous elongated curved beam is linear.

13. A frameless heated wiper blade assembly for vehicle windshields comprising:

a continuous elongated curved beam substantially defining a longitudinal length and a width of the frameless heated wiper blade assembly and comprising a flexible material suitable for conforming to a curved windshield, the continuous elongated curved beam defining oppositely facing upper and lower surfaces, a central portion, first and second opposite ends, first and second opposite end portions that are directly adjacent the first and second opposite ends, respectively, a first intermediate portion extending between the first opposite end portion and the central portion and a second intermediate portion extending between the central portion and the second end portion;

an elongated flexible squeegee attached to the continuous elongated curved beam;

a bracket connected to the central portion of the continuous elongated curved beam, wherein the bracket is configured to releasably connect the heated wiper blade assembly to an arm of the vehicle windshield wiper system;

an electrical resistance heater comprising an elongated electrical conductor that produces heat when electrical current is passed through the electrical conductor, wherein the electrical resistance heater is disposed directly adjacent the upper surface of the continuous elongated curved beam, wherein the electrical conductor defines an electrical resistance that varies with changes in temperature whereby the electrical resistance heater provides significantly more heat energy at lower temperatures, wherein the electrical resistance heater comprises an elongated wire that is encased in a sheath of electrically insulative material, the elongated wire comprising a pair of leads adjacent the central portion of the continuous elongated elongated beam and at least two elongated loops extending in opposite directions away from the leads, and wherein the elongated loops include at least two strands of wire that extend generally side-by-side in contact with the upper surface of the continuous elongated curved beam; and a cover extending over portions of the electrical resistance heater that are directly adjacent the first and second opposite ends and the first and second intermediate portions of the continuous elongated curved beam to thereby prevent direct exposure of the electrical resistance heater to air moving adjacent a vehicle in use.

14. A frameless heated wiper blade assembly for vehicle windshields, comprising:

a continuous elongated curved beam defining a longitudinal length and a width of the frameless heated wiper blade assembly and comprising a flexible material suitable for conforming to a curved windshield that defines a longitudinal length of the continuous elongated curved beam, the continuous elongated curved beam defining oppositely facing upper and lower surfaces, a central portion, first and second opposite ends, first and second opposite end portions that are directly adjacent the first and second opposite ends, respectively, a first intermediate portion extending between the first opposite end portion and the central portion and a second intermediate portion extending between the central portion and the second end portion;

an elongated flexible squeegee attached to the continuous elongated curved beam;

a bracket connected to the central portion of the continuous elongated curved beam, wherein the bracket is configured to releasably connect the heated wiper blade assembly to an arm of the vehicle windshield wiper system;

an electrical resistance heater comprising an elongated electrical conductor that produces heat when electrical current is passed through the electrical conductor, wherein the electrical resistance heater is disposed directly adjacent the upper surface of the continuous elongated curved beam, and wherein the electrical conductor comprises a plurality of transverse portions that extend transverse relative to the longitudinal length, the transverse portions being substantially linear and adjacent transverse portions define distances therebetween, and wherein the distances are smaller adjacent the first and second opposite end portions of the beam than at the first and second intermediate portions of the continuous elongated curved beam, and wherein the electrical conductor includes a plurality of substantially linear longitudinal portions extending generally parallel to the longitudinal length and interconnecting the transverse portions; and a cover extending over portions of the electrical resistance heater that are directly adjacent the first and second opposite ends and the first and second intermediate portions of the continuous elongated curved beam to thereby prevent direct exposure of the electrical resistance heater to air moving adjacent a vehicle in use.

15. A frameless heated wiper blade assembly for vehicle windshields, comprising:

a continuous elongated curved beam substantially defining a longitudinal length and a width of the frameless heated wiper blade assembly and comprising a flexible material suitable for conforming to a curved windshield, the continuous elongated curved beam defining oppositely facing upper and lower surfaces, a central portion, first and second opposite ends, first and second opposite end portions that are directly adjacent the first and second opposite ends, respectively, a first intermediate portion extending between the first opposite end portion and the central portion and a second intermediate portion extending between the central portion and the second end portion;

an elongated flexible squeegee attached to the continuous elongated curved beam;

a bracket connected to the central portion of the continuous elongated curved beam, wherein the bracket is configured to releasably connect the heated wiper blade assembly to an arm of vehicle windshield wiper system;

an electrical resistance heater comprising an elongated electrical conductor that produces heat when electrical current is passed through the electrical conductor, wherein the electrical resistance heater is disposed directly adjacent the upper surface of the continuous elongated curved beam, wherein the electrical conductor comprising an elongated wire that is encased in a sheath of electrically insulative material, the elongated wire is comprised of a positive temperature coefficient material that generates a first heat energy if the heating element is at a first temperature and generates a second heat energy that is significantly less than the first heat energy if the heating element is at a second temperature that is significantly greater than the first temperature; and a cover extending over portions of the electrical resistance heater that are directly adjacent the first and second opposite ends and the first and second intermediate portions of the continuous elongated curved beam, wherein the electrical resistance heater is disposed in an elongated cavity defined in part by an inner surface of the cover, and thereby prevents direct exposure of the electrical resistance heater to air moving adjacent a vehicle in use.

16. The frameless heated wiper blade assembly for vehicles of claim 15, wherein the cover member comprises an outer layer and an inner core, wherein the outer layer is significantly harder than the inner core, and wherein the inner core pushes the electrical heating element into contact with the upper surface of the continuous elongated curved beam.

17. The frameless heated wiper blade assembly of claim 16, wherein the outer layer and the inner core comprise first and second distinctly different materials.

18. The frameless heated wiper blade assembly of claim 15, wherein the continuous elongated curved beam defines elongated opposite side edges and the electrical resistance heater is disposed adjacent the opposite side edges of the continuous elongated curved beam.

* * * * *